United States Patent
Kikuchi (10) Patent No.: US 10,688,998 B2
(45) Date of Patent: Jun. 23, 2020

(54) CONTROL APPARATUS FOR FOUR-WHEEL DRIVE VEHICLE

(71) Applicant: TOYOTA JIDOSHA KABUSHIKI KAISHA, Toyota-shi, Aichi-ken (JP)

(72) Inventor: Shin Kikuchi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/294,252

(22) Filed: Mar. 6, 2019

(65) Prior Publication Data

US 2019/0276023 A1 Sep. 12, 2019

(30) Foreign Application Priority Data

Mar. 8, 2018 (JP) ................................. 2018-041503

(51) Int. Cl.
*B60W 30/184* (2012.01)
*B60W 30/188* (2012.01)
*B60W 10/119* (2012.01)

(52) U.S. Cl.
CPC ........ *B60W 30/188* (2013.01); *B60W 10/119* (2013.01); *B60W 2510/18* (2013.01); *B60W 2520/28* (2013.01); *B60W 2710/182* (2013.01); *B60W 2720/26* (2013.01)

(58) Field of Classification Search
None
See application file for complete search history.

(56) References Cited

U.S. PATENT DOCUMENTS

| 6,568,177 B1* | 5/2003 | Surnilla | F02D 41/0087 123/198 F |
| 2002/0023793 A1* | 2/2002 | Hattori | B60T 7/22 180/169 |
| 2003/0221682 A1* | 12/2003 | Surnilla | F01N 3/0814 123/688 |
| 2014/0110999 A1* | 4/2014 | Eberling | B60T 8/885 303/122 |
| 2018/0056965 A1* | 3/2018 | Houtman | B60T 8/3255 |

FOREIGN PATENT DOCUMENTS

| JP | 9-221017 A | 8/1997 |
| JP | 2014-069712 A | 4/2014 |

* cited by examiner

Primary Examiner — Justin Holmes
(74) Attorney, Agent, or Firm — Sughrue Mion, PLLC (57) ABSTRACT

A control apparatus for a four-wheel drive vehicle is configured to acquire wheel speed differences, which are differences between wheel speeds of respective wheels and a reference speed, and execute traction control of causing a braking device to apply braking forces to wheels having wheel speed differences equal to or more than a predetermined control start value, the control apparatus being configured to, when a temperature of an actuator in a hydraulic circuit of the braking device is equal to or higher than a predetermined first temperature threshold value, select, as the reference speed, a wheel speed higher than a wheel speed that is selected as the reference speed when the temperature of the actuator is lower than the first temperature threshold value.

4 Claims, 5 Drawing Sheets

CONTROL APPARATUS FOR FOUR-WHEEL DRIVE VEHICLE

CLAIM OF PRIORITY

The present application claims priority from Japanese patent application JP 2018-041503 filed on Mar. 8, 2018, the content of which is hereby incorporated by reference into this application.

BACKGROUND

1. Technical Field

The present disclosure relates to a control apparatus for a four-wheel drive vehicle.

2. Description of the Related Art

Hitherto, there has been known a control apparatus for a vehicle configured to apply/exert, when a wheel slips, a braking force to/on the slipping wheel to suppress the slip of the wheel. This type of control is also referred to as "traction control" or "anti-slip regulation".

When the traction control is continuously executed for a long period of time, there is a problem in that temperatures of components in a hydraulic circuit of a braking device excessively increase. Examples of the components whose temperatures increase include a motor configured to drive a pump and solenoid valves.

In order to address the above problem, an apparatus (hereinafter referred to as "related-art apparatus") proposed in Japanese Patent Application Laid-open No. H09-221017 is configured to stop traction control when a temperature of a solenoid valve in a hydraulic circuit exceeds a predetermined threshold value.

The related-art apparatus assumes a state in which the vehicle cannot physically start to travel (for example, a state in which the vehicle starts to travel on a road surface having an extremely low road surface friction coefficient p and on a steep ascending slope). Thus, even when the related-art apparatus stops the traction control, inconvenience does not occur.

Meanwhile, in particular, a vehicle capable of driving four wheels often travels on a specific road surface (for example, an off-road road surface having irregularities) on which wheels may frequently slip. Under this state, although one or more of the four wheels frequently slip, the traction control is executed every time the slip occurs, and thus the vehicle can relatively stably travel on the specific road surface.

However, when the traction control is frequently executed, the temperatures of the components in the hydraulic circuit rapidly increase as in the case in which the traction control is executed continuously for a long period of time. Thus, the related-art apparatus stops the traction control at a time when a relatively short period of time has elapsed after the start of the travel on the specific road surface. Therefore, with the related-art apparatus, there occurs a problem in that the slips of the wheels frequently occur when the vehicle is traveling on the specific road surface, and consequently, the vehicle cannot travel stably.

SUMMARY

The present disclosure provides a control apparatus for a four-wheel drive vehicle, which is capable of suppressing a rapid increase in temperatures of components in a hydraulic circuit even while traction control is being executed under a state in which the four-wheel drive vehicle is traveling on a specific road surface.

There is provided a control apparatus for a four-wheel drive vehicle (hereinafter sometimes referred to as "embodiment apparatus") including: a drive device (20) configured to generate a driving force; a driving force transmission device (31, 32, 33, 34, 35, 36L, 36R, 37, 38L, and 38R) configured to transmit the driving force to a left front wheel (Wfl), a right front wheel (Wfr), a left rear wheel (Wrl), and a right rear wheel (Wrr); a braking device (40) including a hydraulic circuit (43) including a flow path through which brake fluid flows, a plurality of solenoid valves (202, 212, 216, and 227), a pump (222), and a drive unit (260) configured to drive the pump, the braking device being configured to apply a braking force independently to each of the left front wheel, the right front wheel, the left rear wheel, and the right rear wheel in accordance with a hydraulic pressure of the brake fluid supplied from the hydraulic circuit; a temperature acquisition device (261 and 70) configured to execute one of acquisition and estimation of a temperature (Tm) of one of: the plurality of solenoid valves; and the drive unit, as an actuator temperature; and a controller (70) configured to start traction control of causing the braking device to apply the braking force to a wheel having a wheel slip index value equal to or more than a predetermined control start threshold value (Th0), the wheel slip index value being correlated with a wheel speed difference ($\Delta$Vwfl, $\Delta$Vwfr, $\Delta$Vwrl, and $\Delta$Vwrr), which is a difference between a wheel speed (Vwfl, Vwfr, Vwrl, and Vwrr) of each of the left front wheel, the right front wheel, the left rear wheel, and the right rear wheel and a reference speed (Vw_ref).

Further, the controller is configured to: select (Step 425) a low-side wheel speed, which is any one of a first low wheel speed (Vwmin), which is the lowest wheel speed, and a second low wheel speed (Vwmdl), which is the second lowest wheel speed, out of the wheel speeds of the left front wheel, the right front wheel, the left rear wheel, and the right rear wheel as the reference speed when the actuator temperature is lower than a predetermined first temperature threshold value (Step 420: Yes); and select (Step 435 and Step 440) a wheel speed (Vwmdl and Vwmdh) that is different from the highest wheel speed (Vwmax), which is a wheel speed having the highest speed, and is higher than the low-side wheel speed selected as the reference speed when the actuator temperature is lower than the predetermined first temperature threshold value, out of the wheel speeds of the left front wheel, the right front wheel, the left rear wheel, and the right rear wheel, as the reference speed when the actuator temperature is equal to or higher than the predetermined first temperature threshold value (Step 420: No).

The embodiment apparatus having the configuration described above starts the traction control of causing the braking device to exert the braking force on a wheel having the wheel slip index value, which is correlated with the wheel speed difference being the difference between the wheel speed and the reference speed, equal to or more than the predetermined control start threshold value. The wheel slip index value may be the wheel speed difference, or may be a value (for example, slip ratio) obtained by dividing the wheel speed difference by the reference speed.

Further, the embodiment apparatus selects any one of the first low wheel speed and the second low wheel speed (namely, the low-side wheel speed) as the reference speed when the actuator temperature acquired or estimated by the temperature acquisition device is lower than the first temperature threshold value (hereinafter referred to as "first state"). Conversely, when the temperature is equal to or higher than the predetermined first temperature threshold value (hereinafter referred to as "second state"), the embodiment apparatus selects a wheel speed higher than the low-side wheel speed, which is selected as the reference speed under the first state. Thus, under the second state, the wheel slip index value correlated with the difference (wheel speed difference) between the reference speed and the wheel speed tends to be small as compared with the first state. Thus, under the second state, a frequency at which the wheel slip index value is equal to or more than the control start threshold value of the traction control is low as compared with the first state. That is, under the second state, a frequency of executing the traction control in a certain period is low as compared with the first state. As a result, a rapid increase in the temperature of the actuator (motor or solenoid valve) in the hydraulic circuit can be suppressed. Thus, the traction control can be continued while the actuator temperature is prevented from excessively increasing, and the vehicle can thus stably travel on, for example, the above-mentioned specific road surface.

In one aspect of the embodiment apparatus, the controller is configured to inhibit execution of the traction control when the actuator temperature is higher than a stop temperature, which is higher than the predetermined first temperature threshold value (Step 510: Yes).

According to this aspect, the execution of the traction control is inhibited when the temperature of the actuator (motor or solenoid valve) in the hydraulic circuit of the braking device excessively increases, and malfunction can thus be prevented from occurring to the actuator in the hydraulic circuit of the braking device.

In one aspect of the embodiment apparatus, the controller is configured to: select (Step 425) the first low wheel speed as the reference speed when the actuator temperature is lower than the predetermined first temperature threshold value (Step 420: Yes); select (Step 435) the second low wheel speed as the reference speed when the actuator temperature is equal to or higher than the predetermined first temperature threshold value and lower than a predetermined second temperature threshold value (T2), which is higher than the predetermined first temperature threshold value (Step 420: No, and Step 430: Yes); and select (Step 440) a third low wheel speed (Vwmdh), which is the third lowest wheel speed out of the wheel speeds of the left front wheel, the right front wheel, the left rear wheel, and the right rear wheel, as the reference speed when the actuator temperature is equal to or higher than the predetermined second temperature threshold value (Step 420: No, and Step 430: No).

The controller in this aspect uses the two temperature threshold value values (first temperature threshold value and second temperature threshold value) to select the reference speed. As a result, the execution frequency of the traction control in a certain period gradually decreases as the temperature increases. Thus, the increase in the temperature of the actuator (motor or solenoid valve) in the hydraulic circuit in the braking device can more effectively be suppressed. The traction control can be continued while the actuator temperature is prevented from excessively increasing, and the vehicle can thus stably travel on, for example, the above-mentioned specific road surface.

In one aspect of the embodiment apparatus, the controller is configured to inhibit execution of the traction control when the actuator temperature is higher than a stop temperature, which is higher than the predetermined second temperature threshold value (Step 510: Yes).

According to this aspect, the execution of the traction control is inhibited when the temperature of the actuator (motor or solenoid valve) in the hydraulic circuit of the braking device excessively increases, and malfunction can thus be prevented from occurring to the actuator in the hydraulic circuit of the braking device.

In the above description, for easier understanding of the above one or more aspect of the embodiment apparatus, the terms and/or reference symbols used in embodiments described later are enclosed in parentheses and assigned to each of the constituent features of the apparatus. However, each of the constituent features of the apparatus is not limited to the embodiments defined by the terms and/or reference symbols.

BRIEF DESCRIPTION OF THE DRAWINGS

FIG. 3A and FIG. 3B are timing charts at the time when a brake ECU in the embodiment of the present disclosure executes traction control, in which FIG. 3A is a chart for showing timings of on/off of the traction control.

DESCRIPTION OF THE EMBODIMENTS

Now, referring to the accompanying drawings, a description is given of one or more embodiments of the present disclosure. The accompanying drawings are illustrations of the embodiments, but those illustrations are examples to be used for the understanding of the embodiments, and are not to be used to limit the interpretation of the present disclosure.

<Configuration>

Figure 1:
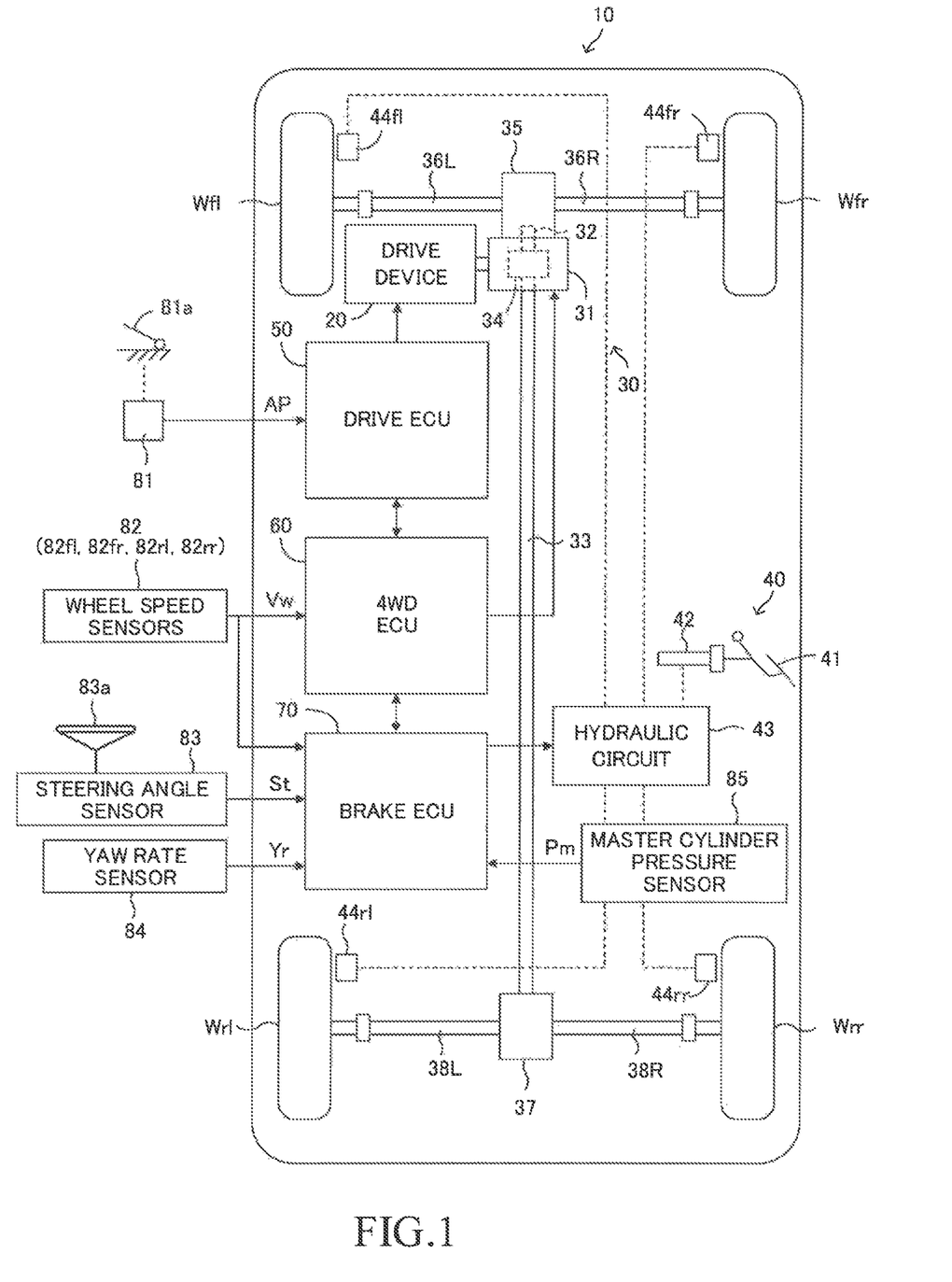
FIG. 1 is a schematic configuration diagram for illustrating a control apparatus of a four-wheel drive vehicle according to an embodiment of the present disclosure.

As illustrated in FIG. 1, a control apparatus for a four-wheel drive vehicle according to one embodiment of the present disclosure (hereinafter sometimes simply referred to as "control apparatus") is applied to a four-wheel drive vehicle 10.

The vehicle 10 includes a drive device 20, a driving force transmission device 30, a braking device 40, a drive ECU 50, a 4WD ECU 60, and a brake ECU 70. The brake ECU 70 corresponds to the control apparatus according to one embodiment. Two or more of those ECUs may be integrated into one ECU.

Those ECUs are electric control units each including a microcomputer as a main part, and are connected to one another so as to be capable of mutually transmitting and receiving information via a controller area network (CAN) (not shown). The microcomputer herein includes, for example, a CPU, a RAM, a ROM, and an interface (I/F). The CPU executes instructions (programs and routines) stored in the ROM to implement various functions described later.

The drive device 20 is configured to generate a driving force for traveling of the vehicle 10. The drive device 20 drives wheels (a left front wheel Wfl, a right front wheel Wfr, a left rear wheel Wrl, and a right rear wheel Wrr) of the vehicle 10 via the driving force transmission device 30. The drive device 20 is formed of a combination of a general internal combustion engine and a general transmission device of a vehicle. The drive device 20 may be any drive device for a vehicle publicly known in this technical field, such as a combination of a motor and a transmission device and a combination of an internal combustion engine, a motor, and a transmission device.

The driving force transmission device 30 includes a center differential device 31, a front wheel rotary shaft 32, a rear wheel rotary shaft 33, a differential limiting device 34, a front wheel differential gear device 35, a left front wheel axle 36L, a right front wheel axle 36R, a rear wheel differential gear device 37, a left rear wheel axle 38L, and a right rear wheel axle 38R.

The center differential device 31 is configured to transmit the driving force from the drive device 20 to the front wheel rotary shaft 32 and the rear wheel rotary shaft (propeller shaft) 33, and to allow a rotation speed difference between the front wheel rotary shaft 32 and the rear wheel rotary shaft 33. The center differential device 31 includes the differential limiting device 34.

The differential limiting device 34 is configured to selectively switch between a differential state, in which a rotational difference between the front wheel rotary shaft 32 and the rear wheel rotary shaft 33 is allowed, and a non-differential state, in which the rotational difference between the front wheel rotary shaft 32 and the rear wheel rotary shaft 33 is limited, in accordance with an instruction signal from the 4WD ECU 60. The differential state is also referred to as "center-differential free state". The non-differential state is also referred to as "center-differential locked state".

The front wheel differential gear device 35 is configured to transmit the driving force transmitted from the drive device 20 via the front wheel rotary shaft 32 to the left front wheel axle 36L and the right front wheel axle 36R, and to allow a differential between the left front wheel axle 36L and the right front wheel axle 36R. As a result, the left front wheel Wfl and the right front wheel Wfr are rotationally driven.

The rear wheel differential gear device 37 is configured to transmit the driving force transmitted from the drive device 20 via the rear wheel rotary shaft 33 to the left rear wheel axle 38L and the right rear wheel axle 38R, and to allow a differential between the left rear wheel axle 38L and the right rear wheel axle 38R. As a result, the left rear wheel Wrl and the right rear wheel Wrr are rotationally driven.

The braking device 40 includes, for example, a brake pedal 41, a master cylinder 42, a hydraulic circuit 43, and wheel cylinders 44 (44*fl*, 44*fr*, 44*rl*, and 44*rr*).

The hydraulic circuit 43 functions as a brake actuator. The hydraulic circuit 43 includes flow paths through which brake fluid flows, a plurality of valves, pumps, and motors configured to drive the pumps. Braking forces (braking torques) for the left front wheel Wfl, the right front wheel Wfr, the left rear wheel Wrl, and the right rear wheel Wrr are controlled by the hydraulic circuit 43 of the braking device 40 controlling braking pressures of corresponding wheel cylinders 44*fl*, 44*fr*, 44*rl*, and 44*rr*. As described later, the braking pressure of each of the wheel cylinders 44 is controlled based on a pressure (hereinafter sometimes referred to as "master cylinder pressure") Pm of the master cylinder 42, which is driven in accordance with a stepping operation on the brake pedal 41 by a driver in a normal state, or is controlled individually (independently) by traction control described later.

The drive ECU 50 is electrically connected to various sensors including an accelerator opening degree sensor 81, and is configured to receive output signals from those sensors. The accelerator opening degree sensor 81 is configured to generate an output signal indicating a stepping amount (hereinafter sometimes referred to as "accelerator opening degree") AP of an accelerator pedal 81*a*, which is provided so as to be operable by the driver. The drive ECU 50 is electrically connected to the drive device 20. The drive ECU 50 is configured to transmit various signals for controlling the drive device 20 based on, for example, the stepping amount AP of the accelerator pedal 81*a* and an operation of a shift lever (not shown).

The 4WD ECU 60 is electrically connected to wheel speed sensors 82 (82*fl*, 82*fr*, 82*rl*, and 82*rr*), and is configured to receive output signals from those sensors. The wheel speed sensors 82*fl*, 82*fr*, 82*rl*, and 82*rr* are configured to generate output signals representing rotational angular velocities of the left front wheel Wfl, the right front wheel Wfr, the left rear wheel Wrl, and the right rear wheel Wrr, respectively. The 4WD ECU 60 calculates a wheel speed Vw based on Expression (1). In Expression (1), r represents a dynamic radius of the wheel (tire), and ω represents an angular velocity of the wheel. The wheel speeds of the left front wheel Wfl, the right front wheel Wfr, the left rear wheel Wrl, and the right rear wheel Wrr are hereinafter referred to as "wheel speeds Vwfl, Vwfr, Vwrl, and Vwrr", respectively.

$$Vw = r \cdot \omega \tag{1}$$

When the dynamic radius r of the wheel is considered to be constant in each of the left front wheel Wfl, the right front wheel Wfr, the left rear wheel Wrl, and the right rear wheel Wrr, the rotational angular velocity and the wheel speed correspond to each other. Thus, the 4WD ECU 60 may handle the rotational angular velocity detected by the wheel speed sensor 82 as the wheel speed.

The brake ECU 70 is electrically connected to the wheel speed sensors 82 (82*fl*, 82*fr*, 82*rl*, and 82*rr*), a steering angle sensor 83, a yaw rate sensor 84, and a master cylinder pressure sensor 85, for example, and is configured to receive output signals from those sensors. The steering angle sensor 83 is configured to generate an output signal representing a steering angle St of a steering wheel 83*a* provided so as to be operable by the driver. The yaw rate sensor 84 is configured to generate an output signal representing a yaw rate Yr of the vehicle 10. The master cylinder pressure sensor 85 is configured to generate an output signal representing a master cylinder pressure Pm.

The brake ECU 70 further calculates target braking forces Fbfl, Fbfr, Fbrl, and Fbrr of the left front wheel Wfl, the right front wheel Wfr, the left rear wheel Wrl, and the right rear wheel Wrr, respectively. The brake ECU 70 controls the braking pressure of each of the wheel cylinders 44*fl*, 44*fr*, 44*rl*, and 44*rr* corresponding to the respective wheels so that the braking force of each of the wheels reaches (becomes equal to/matches up with) the corresponding target braking force.

<Configuration of Hydraulic Circuit>

Figure 2:
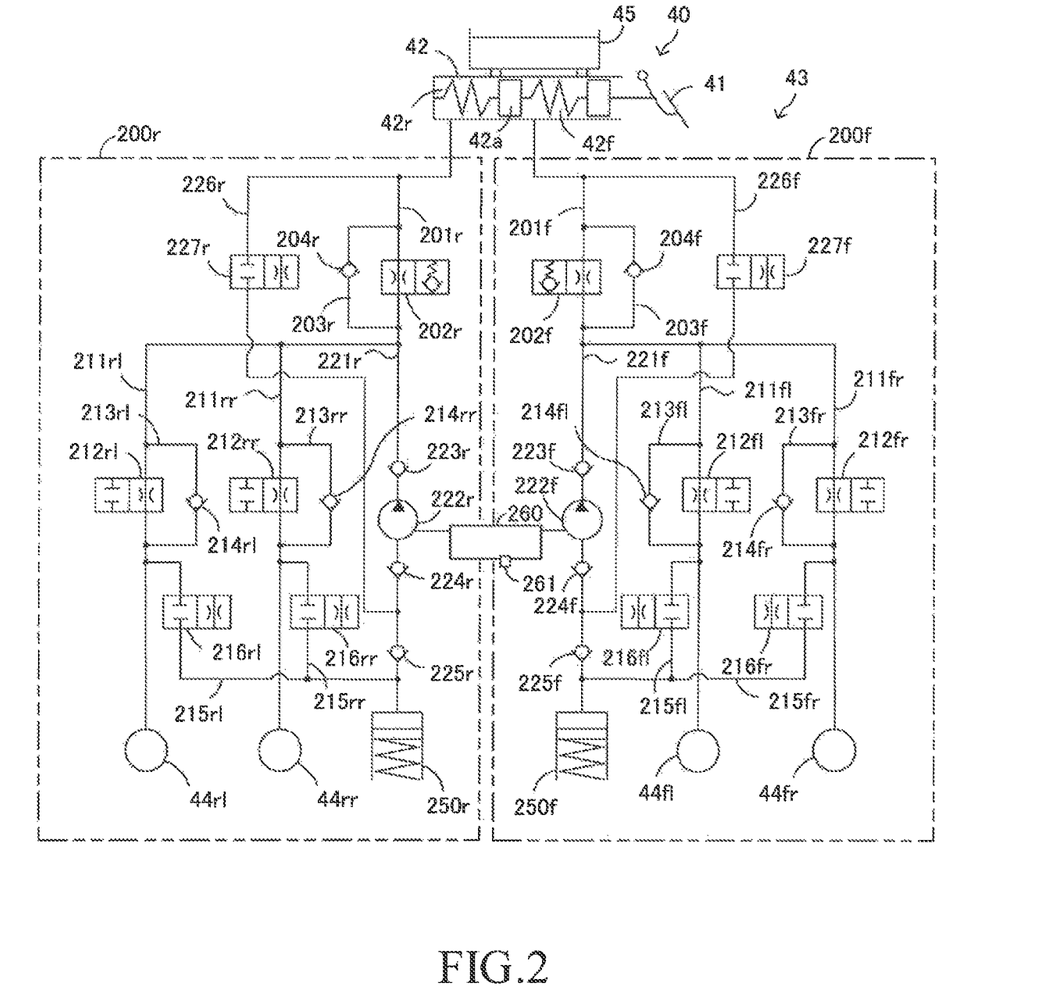
FIG. 2 is a schematic configuration diagram for illustrating a hydraulic circuit in the embodiment of the present disclosure.

Referring to FIG. 2, a description is now given of a configuration of the hydraulic circuit 43. An suffix of alphabet letters, which is assigned after the end of each reference numeral of FIG. 2, represents to which wheel a component corresponds. The symbols "f", "r", "fr", "rl", and "rr" correspond to "front wheels (left front wheel and right front wheel)", "rear wheels (left rear wheel and right rear wheel)", "left front wheel", "right front wheel", "rear left wheel", and "rear right wheel", respectively. In the following description, a suffix "*" represents any one of "fl, fr, rl, and rr", "f*" represents any one of "fl and fr", and "r*" represents any one of "rl and rr".

The master cylinder 42 includes a first master cylinder chamber 42f and a second master cylinder chamber 42r partitioned by a free piston 42a. The master cylinder 42 receives supply of brake fluid from a reservoir 45 to pressure-feed the brake fluid to a front wheel system 200f and a rear wheel system 200r in accordance with a stepping force on the brake pedal 41.

First, a description is given of the front wheel system 200f. A first pipeline 201f for the front wheels is connected to the first master cylinder chamber 42f. A first solenoid valve 202f of the normally-open type is provided in the first pipeline 201f. In the following, a "portion on the master cylinder 42 side with respect to the first solenoid valve 202" in the first pipeline 201f is referred to as "upstream portion", and a "portion on an opposite side of the master cylinder 42 side with respect to the first solenoid valve 202" in the first pipeline 201f is referred to as "downstream portion". Further, one end of a first bypass pipe 203f is connected to the upstream portion of the first pipeline 201f. The other end of the first bypass pipe 203f is connected to the downstream portion of the first pipeline 201f. The first bypass pipe 203f includes a check valve 204f, and is thus configured to allow only a flow of the brake fluid from the first master cylinder chamber 42f to the downstream portion of the first pipeline 201f.

One end of a first pipe 211[f*] is connected to the downstream portion of the first pipeline 201f. The other end of the first pipe 211[f*] is connected to the wheel cylinder 44[f*]. A pressure increasing valve 212[f*] is provided in the first pipe 211[f*]. The pressure increasing valve 212[f*] is a solenoid valve of the normally-open type. Further, a second bypass pipe 213[f*] is connected to the first pipe 211[f*] so as to bypass the pressure increasing valve 212[f*]. The second bypass pipe 213[f*] includes a check valve 214[f*], and is thus configured to allow only a flow of the brake fluid from the wheel cylinder 44[f*] to the first pipeline 201f.

One end of a second pipe 215[f*] is connected to a "portion between the pressure increasing valve 212[f*] and the wheel cylinder 44[r]" in the first pipe 211[r]. The other end of the second pipe 215[f*] is connected to a buffer reservoir 250f. A pressure reducing valve 216[f*] is provided in the second pipe 215[f*]. The pressure reducing valve 216[f*] is a solenoid valve of the normally-closed type.

Further, one end of a second pipeline 221f is connected to the downstream portion of the first pipeline 201f. The other end of the second pipeline 221f is connected to the buffer reservoir 250f. A pump 222f is provided in the second pipeline 221f. A check valve 223f is provided in a portion on a discharge side of the pump 222f in the second pipeline 221f. The check valve 223f is configured to allow only a flow of the brake fluid from the pump 222f to the first pipeline 201f side. Check valves 224f and 225f are provided in a portion on a suction side of the pump 222f in the second pipeline 221f. The check valves 224f and 225f are configured to allow only a flow of the brake fluid from the second pipes 215[f*] to the pump 222f.

Further, one end of a third pipeline 226f is connected to the upstream portion of the first pipeline 201f. The other end of the third pipeline 226f is connected to a "portion between the check valve 224f and the check valve 225f" in the second pipeline 221f. A second solenoid valve 227f of the normally-closed type is provided in the third pipeline 226f.

The rear-wheel system 200r has the same configuration as that of the front-wheel system 200f. A first pipeline 201r for the rear wheels is connected to the second master cylinder chamber 42r. A first solenoid valve 202r of the normally-open type is provided in the first pipeline 201r. Further, one end of a first bypass pipe 203r is connected to the upstream portion of the first pipeline 201r. The other end of the first bypass pipe 203r is connected to the downstream portion of the first pipeline 201r. The first bypass pipe 203r includes a check valve 204r, and is thus configured to allow only a flow of the brake fluid from the second master cylinder chamber 42r to the downstream portion of the first pipeline 201r.

One end of a first pipe 211[r*] is connected to the downstream portion of the first pipeline 201r. The other end of the first pipe 211[r*] is connected to the wheel cylinder 44[r*]. A pressure increasing valve 212[r] is provided in the first pipe 211[r]. Further, a second bypass pipe 213[r*] is connected to the first pipe 211[r*] so as to bypass the pressure increasing valve 212[r*]. The second bypass pipe 213[r*] includes a check valve 214[r*], and is thus configured to allow only a flow of the brake fluid from the wheel cylinder 44[r*] to the first pipeline 201r.

One end of a second pipe 215[r*] is connected to a "portion between the pressure increasing valve 212[r*] and the wheel cylinder 44[r*]" in the first pipe 211[r]. The other end of the second pipe 215[r*] is connected to a buffer reservoir 250r. A pressure reducing valve 216[r*] is provided in the second pipe 215[r*].

Further, one end of a second pipeline 221r is connected to the downstream portion of the first pipeline 201r. The other end of the second pipeline 221r is connected to the buffer reservoir 250r. A pump 222r is provided in the second pipeline 221r. A check valve 223r is provided in a portion on a discharge side of the pump 222r in the second pipeline 221r. The check valve 223r is configured to allow only a flow of the brake fluid from the pump 222r to the first pipeline 201r side. Check valves 224r and 225r are provided in a portion on a suction side of the pump 222r in the second pipeline 221r. The check valves 224r and 225r are configured to allow only a flow of the brake fluid from the second pipes 215[r*] to the pump 222r.

Further, one end of a third pipeline 226r is connected to the upstream portion of the first pipeline 201r. The other end of the third pipeline 226r is connected to a "portion between the check valve 224r and the check valve 225r" in the second pipeline 221r. A second solenoid valve 227r of the normally-closed type is provided in the third pipeline 226r.

Further, a motor unit 260, which is an actuator configured to drive the pump 222f and the pump 222r, is provided. The motor unit 260 is hereinafter sometimes referred to as "drive unit". The motor unit 260 includes an electric motor configured to drive the pump 222f and an electric motor configured to drive the pump 222r. Further, a temperature sensor (temperature acquisition device) 261 is mounted to the motor unit 260. The temperature sensor 261 is configured to detect a temperature Tm of the motor unit 260 as an actuator temperature, and output a signal indicating the temperature Tm to the brake ECU 70. The temperature acquisition device configured to acquire the actuator temperature is not limited to the temperature sensor 261. As described later, the brake ECU 70 may estimate the actuator temperature from operation information (for example, a current value and a current supply period) on the motor unit 260.

At least one of the pressure increasing valve 212[] or the pressure reducing valve 216[] may be a proportional solenoid valve. Through employment of the proportional solenoid valve, the braking pressure of the wheel cylinder 44[**] is not only adjusted to a value corresponding to an open position or a closed position, but is also adjusted continuously therebetween.

<Control of Braking Pressure of Wheel Cylinder>

A description is now given of control of the braking pressure of the wheel cylinder 44[**]. In the normal state, the open/closed positions of the valves are set to positions illustrated in FIG. 2. The pressure in the first master cylinder chamber 42f is supplied to the wheel cylinders 44[f*]. The pressure in the second master cylinder chamber 42r is supplied to the wheel cylinders 44[r*]. In such a manner, in the normal state, the braking pressure of the wheel cylinder 44[**] is increased or reduced in accordance with the stepping force on the brake pedal 41.

In contrast, in the traction control, the brake ECU 70 sets the first solenoid valves 202f and 202r to the closed position, and sets the second solenoid valves 227f and 227r to the open position. Under this state, the brake ECU 70 is configured to use the motor unit 260 to drive the pumps 222f and 222r.

At this time, when the braking pressure of the wheel cylinder 44[] is to be increased, the brake ECU 70 sets the pressure increasing valve 212[] to the open position, and sets the pressure reducing valve 216[**] to the closed position.

When the braking pressure of the wheel cylinder 44[] is to be maintained, the brake ECU 70 sets the pressure increasing valve 212[] to the closed position, and sets the pressure reducing valve 216[**] to the closed position.

When the braking pressure of the wheel cylinder 44[] is to be reduced, the brake ECU 70 sets the pressure increasing valve 212[] to the closed position, and sets the pressure reducing valve 216[**] to the open position.

Through the above-mentioned control, the braking pressure of the wheel cylinder 44[**] is increased, maintained, or reduced.

<Overview of Traction Control>

The control apparatus is configured to execute the widely-known traction control when the apparatus determines that the wheels slip during acceleration of the vehicle 10 (including a start of the travel of the vehicle 10). As a result, the slips of the wheels are suppressed, thereby being capable of securing the driving force in accordance with a road surface state. "Slip of the wheel" includes a case in which the wheel is lifted from the road surface and a case in which the wheel enters a slip state on a road surface having a low road friction coefficient μ.

As the traction control, there are given: (i) a method of suppressing the driving force of the drive device 20, (ii) a method of applying the braking forces to slipping wheels, and (iii) a combination of these methods. The control apparatus is configured to execute (ii) the "control of applying the braking forces to slipping wheels" as one of the methods of the traction control (this control is hereinafter simply referred to as "traction control"). The traction control in the control apparatus can be executed irrespective of whether the state of the differential limiting device 34 is the center-differential free state or the center-differential locked state.

The brake ECU 70 calculates the wheel speeds Vw[] based on the signals from the wheel speed sensors 82. The brake ECU 70 determines/sets a reference speed Vw_ref based on the calculated wheel speeds Vw[]. In normal cases, the reference speed Vw_ref is a first low wheel speed Vwmin, which is the lowest wheel speed out of the wheel speeds Vw[]. The brake ECU 70 calculates a wheel speed difference $\Delta Vw[]$ (=Vw[]−Vw_ref), which is a difference between the wheel speed Vw[] and the reference speed Vw_ref. The wheel speed difference $\Delta Vw[]$ is an index value (evaluation value) indicating a degree of the slip of the wheel W[], and is also referred to as "wheel slip index value (or wheel slip evaluation value)".

When the wheel speed difference $\Delta Vw[]$ is equal to or more than a predetermined control start threshold value Th0, the brake ECU 70 determines that the wheel W[] is a wheel subject to the traction control (hereinafter simply referred to as "subject wheel"). The brake ECU 70 starts the traction control for the subject wheel by starting to exert the braking force on the subject wheel. For example, the brake ECU 70 obtains a target braking force Fb[] based on a lookup table (map) for defining, in advance, a relationship between the wheel speed difference $\Delta Vw[]$ and the braking force to be exerted/applied.

Further, the brake ECU 70 obtains a specified braking pressure corresponding to the target braking force Fb[] based on a lookup table (map) for defining, in advance, a relationship between the braking force and the specified braking pressure. The specified braking pressure is a target value of the braking pressure of the wheel cylinder 44[]. The brake ECU 70 controls the respective components (various valves and pumps) of the front wheel system 200f and the rear wheel system 200r based on the obtained specified braking pressures.

First, the brake ECU 70 increases the braking pressure of the wheel cylinder 44[] so that the braking pressure of the wheel cylinder 44[] reaches the specified braking pressure. At this time, the braking pressure of the wheel cylinder 44[] gradually increases so as to reach the specified braking pressure. The brake ECU 70 calculates the wheel speed difference $\Delta Vw[]$ of the subject wheel every time a predetermined period of time elapses. When the wheel speed difference $\Delta Vw[]$ of the subject wheel becomes equal to or less than a predetermined first threshold value Th1 (Th0>Th1), the brake ECU 70 reduces the value of the specified braking pressure by a predetermined amount. At this time, the braking pressure of the wheel cylinder 44[] corresponding to the subject wheel gradually decreases so as to reach the specified braking pressure. Then, when the wheel speed difference $\Delta Vw[]$ of the subject wheel becomes equal to or more than a predetermined second threshold value Th2 (Th0>Th2>Th1), the brake ECU 70 increases the value of the specified braking pressure by a predetermined amount. The brake ECU 70 is configured to suppress the slip of the wheel by repeating such an increase and a decrease of the braking pressure. As a result, each of the wheels W[] can transmit the driving force from the drive device 20 to the road surface.

When the wheel speed difference $\Delta Vw[**]$ of the subject wheel is maintained to be equal to or lower than the first threshold value Th1 for a predetermined period of time, the brake ECU 70 finishes the traction control for the subject wheel. That is, the braking force exerted on the subject wheel is reduced to "0".

The brake ECU 70 acquires the temperature Tm of the motor unit 260 from the temperature sensor 261 every time a predetermined period of time elapses. The temperature Tm is also referred to as "actuator temperature". When the temperature Tm exceeds a predetermined stop temperature (inhibition temperature) TL, the brake ECU 70 stops (inhibits) the traction control. When the traction control is stopped, the brake ECU 70 continues the inhibition of the execution of the traction control until the temperature Tm decreases from the predetermined stop temperature TL to a sufficiently low temperature.

<Processing of Traction Control>

As described above, the vehicle may travel on a specific road surface (for example, an off-road road surface having irregularities) on which the slips of wheels W[] may frequently occur. The traction control is frequently executed under this state, and thus the temperatures of the components (for example, the motor units 260 and the various solenoid valves) in the hydraulic circuit 43 rapidly increase. When the temperature Tm of the motor unit 260 exceeds the predetermined stop temperature TL, the control apparatus stops the traction control. As a result, the travel of the vehicle on the specific road surface becomes difficult. From the above, when the vehicle is traveling on the specific road surface, it is required to suppress the increase in the temperature Tm of the motor unit 260 of the hydraulic circuit 43** so as not to enter the state in which the traction control is stopped.

Thus, the control apparatus changes the wheel speed subject to the reference speed Vw_ref in accordance with the temperature Tm of the motor unit 260. In normal cases, the control apparatus selects the first low wheel speed Vwmin as the reference speed Vw_ref. However, when the temperature Tm of the motor unit 260 increases to be equal to or higher than a predetermined first temperature threshold value T1, out of the wheel speeds Vw[], a wheel speed that is different from the highest wheel speed Vwmax, which is a wheel speed having the highest speed, and is relatively higher than the wheel speed selected as the reference speed when the temperature Tm is lower than the first temperature threshold value T1, is selected as the reference speed Vw_ref. As a result, the frequency of the execution of the traction control decreases, and the increase in the temperature Tm of the motor unit 260** can thus be suppressed. As a result, the traction control is not stopped, and the vehicle can thus travel on the specific road surface.

Figure 3A:
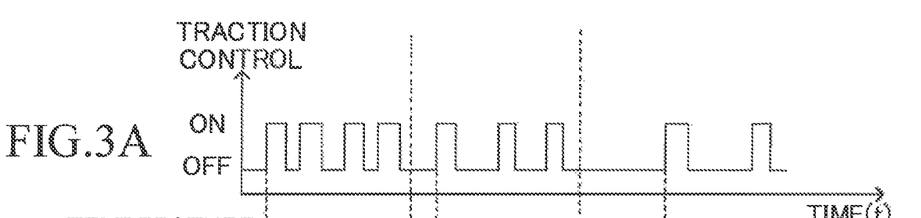
Figure 3B:
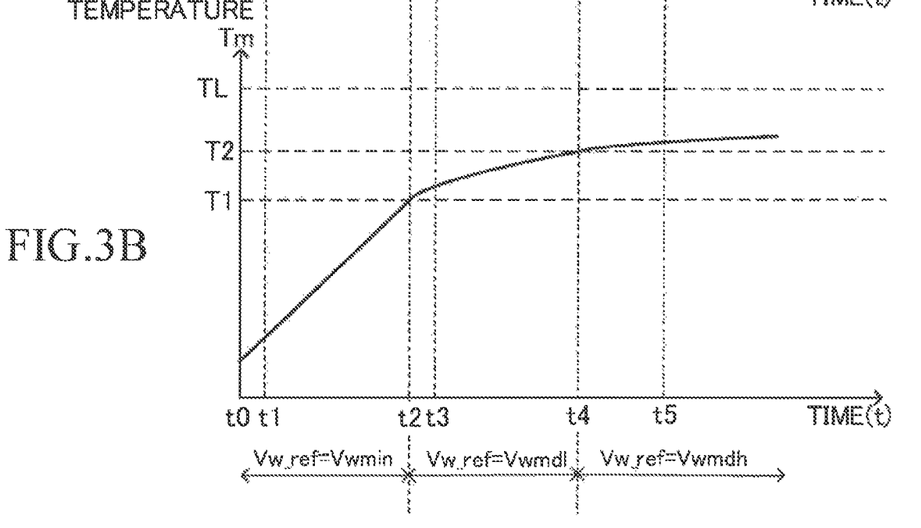
FIG. 3B is a chart for showing a change in a temperature Tm of a motor unit in the hydraulic circuit.

Referring to FIG. 3A and FIG. 3B, a description is now given of processing for the traction control by the control apparatus. In the example shown in FIG. 3A and FIG. 3B, it is assumed that the vehicle 10 starts traveling on the specific road surface at a time t0. At this time, the temperature Tm of the motor unit 260 is lower than the predetermined first temperature threshold value T1. Under this state, the brake ECU 70 selects the first low wheel speed Vwmin, which is the lowest wheel speed out of the wheel speeds Vw[**], as the reference speed Vw_ref.

Thus, three wheels having wheel speeds higher than the first low wheel speed Vwmin may be subjects of the traction control. For example, it is assumed that a relationship in magnitude among the wheel speeds Vw[] is given by Expression (2) at the time t1**.

$$Vwrl < Vwfl < Vwfr < Vwrr \quad (2)$$

In this case, the brake ECU 70 selects the wheel speed Vwrl, which is the first low wheel speed Vwmin, as the reference speed Vw_ref. Then, for the wheels (Wfl, Wfr, and Wrr), which are wheels having wheel speeds higher than the first low wheel speed Vwmin, the brake ECU 70 calculates wheel speed differences ΔVwfl, ΔVwfr, and ΔVwrr. It is now assumed that all the wheel speed differences ΔVwfl, ΔVwfr, and ΔVwrr are equal to or more than the predetermined control start threshold value Th0. The brake ECU 70 determines the left front wheel Wfl, the right front wheel Wfr, and the right rear wheel Wrr as the subject wheels. The brake ECU 70 starts the traction control (that is, exerts braking forces) for the subject wheels.

When the temperature Tm of the motor unit 260 is lower than the predetermined first temperature threshold value T1, the brake ECU 70 employs the first low wheel speed Vwmin as the reference speed Vw_ref, and the wheel speed differences ΔVw[] thus tend to be large. As a result, the traction control is frequently executed, and the temperature Tm of the motor unit 260** thus increases.

It is assumed that the temperature Tm of the motor unit 260 then reaches the predetermined first temperature threshold value T1 at a time t2. At this time, the temperature Tm of the motor unit 260 is equal to or higher than the predetermined first temperature threshold value T1 and lower than a predetermined second temperature threshold value T2 (TL>T2>T1). Under this state, the brake ECU 70 selects a second low wheel speed Vwmdl, which is the second lowest wheel speed out of the wheel speeds Vw[**], as the reference speed Vw_ref.

Thus, two wheels having wheel speeds higher than the second low wheel speed Vwmdl may be subjects of the traction control. For example, it is assumed that a relationship in magnitude among the wheel speeds Vw[] is given by Expression (3) at the time t3**.

$$Vwrr < Vwfr < Vwrl < Vwfl \quad (3)$$

In this case, the brake ECU 70 selects the wheel speed Vwfr, which is the second low wheel speed Vwmdl, as the reference speed Vw_ref. Then, for the wheels (Wrl and Wfl), which are wheels having wheel speeds higher than the second low wheel speed Vwmdl, the brake ECU 70 calculates wheel speed differences ΔVwrl and ΔVwfl. It is now assumed that all the wheel speed differences ΔVwrl and ΔVwfl are equal to or more than the predetermined control start threshold value Th0. The brake ECU 70 determines the left rear wheel Wrl and the left front wheel Wfl as the subject wheels. The brake ECU 70 starts the traction control (that is, exerts braking forces) for the subject wheels.

When the temperature Tm of the motor unit 260 is equal to or higher than the predetermined first temperature threshold value T1 and lower than the predetermined second temperature threshold value T2, the brake ECU 70 employs the second low wheel speed Vwmdl as the reference speed Vw_ref. Thus, as compared with the state (period from the time t0 to the time t2, which is referred to as "first period") in which the temperature Tm is lower than the predetermined first temperature threshold value T1, a relatively higher wheel speed out of the wheel speeds Vw[] is employed as the reference speed Vw_ref. Thus, the wheel speed differences ΔVw[] tend to be small as compared with the first period. As a result, the wheel speed differences ∴Vw[] are less likely to become equal to or more than the control start threshold value Th0, and, as shown in FIG. 3A and FIG. 3B, the execution frequency of the traction control in a certain period thus decreases as compared with the first period. As a result, a rapid increase in the temperature Tm of the motor unit 260** can be suppressed. Thus, a possibility that the temperature Tm reaches the predetermined stop temperature TL can be reduced. Although the execution frequency of the traction control in a certain period decreases, the traction control is not stopped, and the vehicle can thus relatively stably travel on the specific road surface.

It is assumed that the temperature Tm of the motor unit 260 then reaches the predetermined second temperature threshold value T2 at a time t4. At this time, the temperature Tm of the motor unit 260 is equal to or higher than the predetermined second temperature threshold value T2 and equal to or lower than the predetermined stop temperature TL (TL>T2). Under this state, the brake ECU 70 selects a third low wheel speed Vwmdh, which is the third lowest wheel speed out of the wheel speeds Vw[**], as the reference speed Vw_ref.

Thus, one wheel having a higher speed than the third low wheel speed Vwmdh may be a subject of the traction control. For example, it is assumed that a relationship in magnitude among the wheel speeds Vw[**] is given by Expression (4) at the time t5.

$$Vwfl<Vwrr<Vwfr<Vwrl \quad (4)$$

In this case, the brake ECU 70 selects the wheel speed Vwfr, which is the third low wheel speed Vwmdh, as the reference speed Vw_ref. Then, for the wheel (Wrl), which is a wheel having a wheel speed higher than the third low wheel speed Vwmdh, the brake ECU 70 calculates wheel speed difference ΔVwrl. It is now assumed that the wheel speed difference ΔVwrl is equal to or more than the predetermined control start threshold value Th0. The brake ECU 70 determines the left front wheel Wrl as the subject wheel. The brake ECU 70 starts the traction control (that is, exerts a braking force) for the subject wheel.

When the temperature Tm of the motor unit 260 is equal to or higher than the predetermined second temperature threshold value T2 and equal to or lower than the predetermined stop temperature TL, the brake ECU 70 employs the third low wheel speed Vwmdh as the reference speed Vw_ref. Thus, as compared with the state (period from the time t2 to the time t4, which is referred to as "second period") in which the temperature Tim is equal to or higher than the predetermined first temperature threshold value T1 and lower than the predetermined second temperature threshold value T2, a relatively higher wheel speed out of the wheel speeds Vw[] is employed as the reference speed Vw_ref. Thus, the wheel speed differences ΔVw[] tend to be small as compared with the second period. As a result, the wheel speed differences ΔVw[] are less likely to become equal to or more than the control start threshold value Th0, and, as shown in FIG. 3A and FIG. 3B, the execution frequency of the traction control in a certain period thus decreases as compared with the second period. As a result, a rapid increase in the temperature Tm of the motor unit 260** can be suppressed more effectively. Thus, a possibility that the temperature Tm reaches the predetermined stop temperature TL can be reduced. Although the execution frequency of the traction control in a certain period decreases, the traction control is not stopped, and the vehicle can thus relatively stably travel on the specific road surface.

<Operation>

Figure 4:
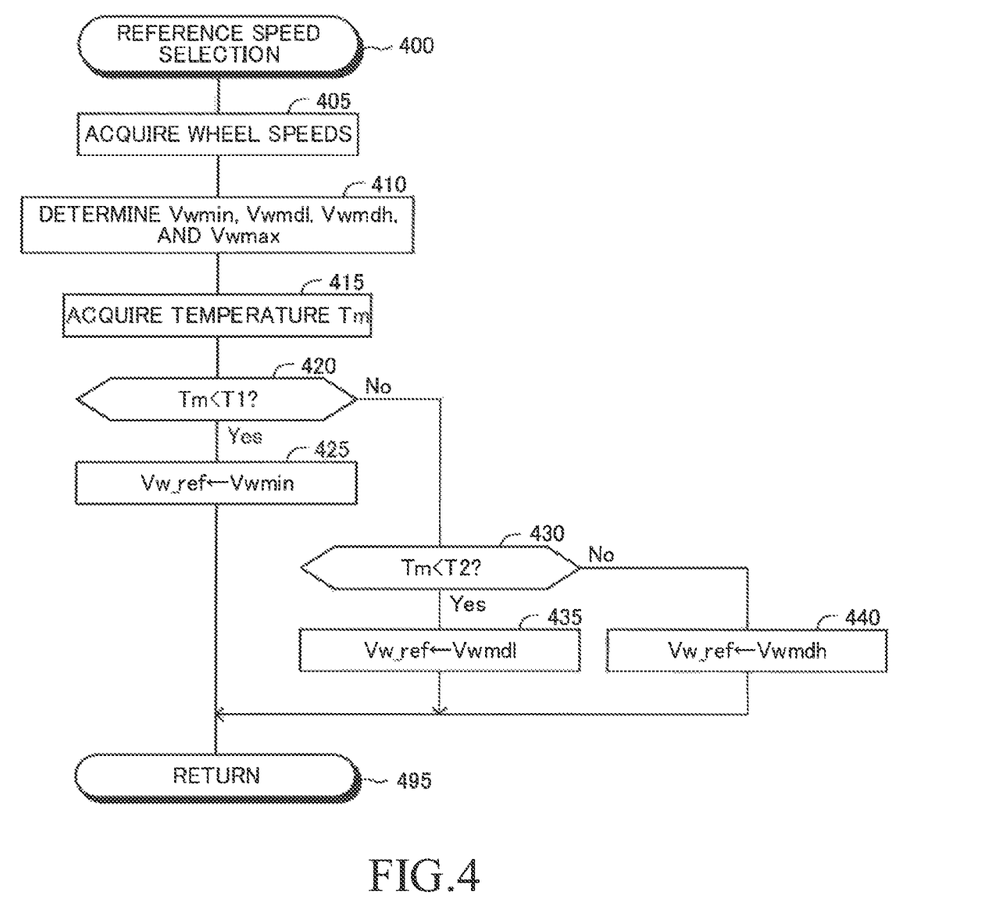
FIG. 4 is a flowchart for illustrating a "reference speed selection routine" to be executed by the brake ECU in the embodiment of the present disclosure.
Figure 5:
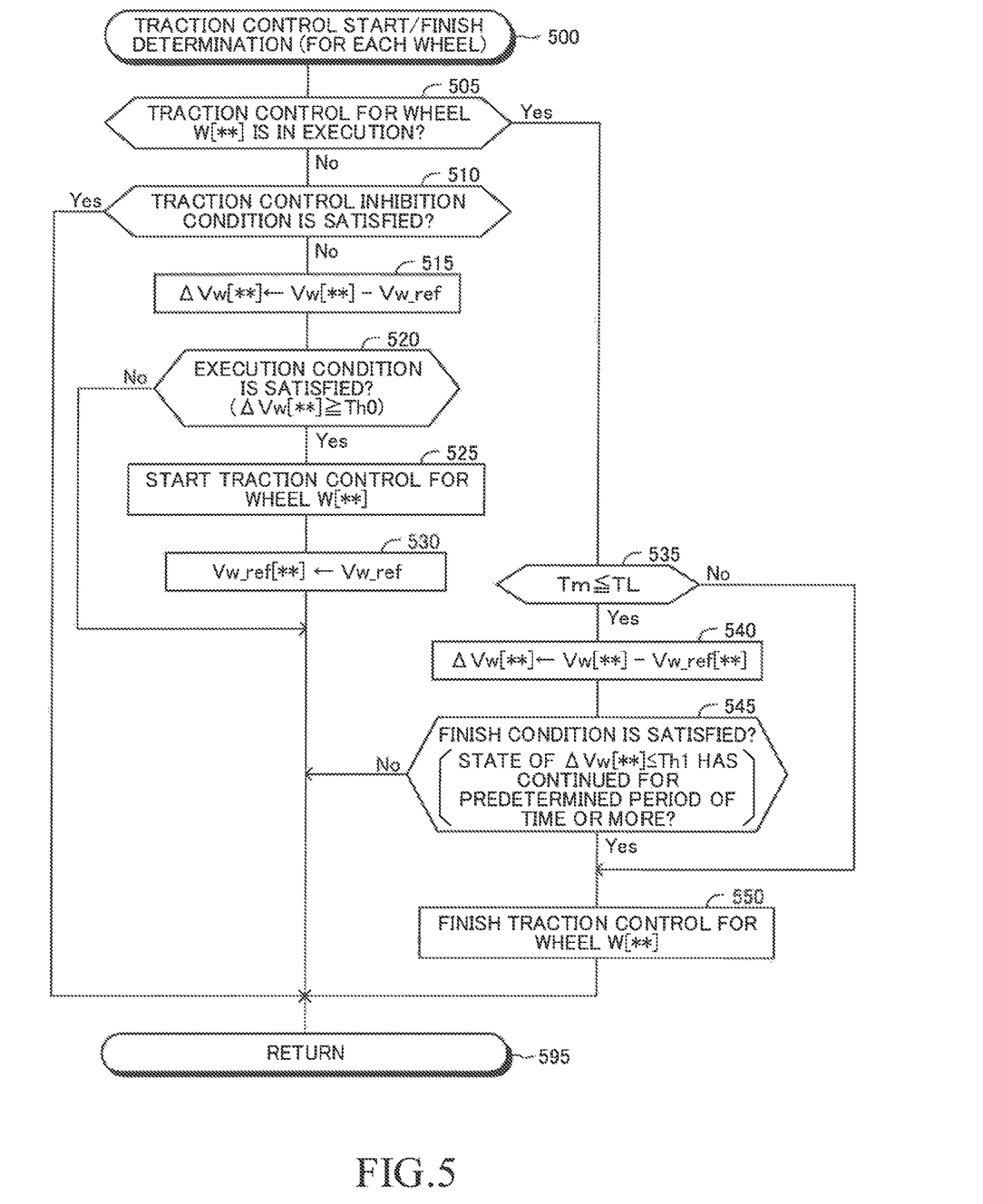
FIG. 5 is a flowchart for illustrating a "traction control start/finish determination routine" to be executed by the brake ECU in the embodiment of the present disclosure.

A description is now given of an operation of the CPU of the brake ECU 70 (also simply referred to as "CPU"). Referring to FIG. 4 and FIG. 5, a description is now given of the operation of the CPU in a plurality of states divided in accordance with the temperature Tm of the motor unit 260.

(State 1) The temperature Tm of the motor unit 260 is lower than the predetermined first temperature threshold value T1.

The CPU is configured to execute a "reference speed selection routine" illustrated in FIG. 4 every time a predetermined period of time elapses. The CPU starts the routine of FIG. 4 from Step 400 at a predetermined timing to sequentially execute processing in Step 405 to Step 415, and then proceeds to Step 420.

Step 405: The CPU acquires the rotational angular velocities of the wheels W[] from the wheel speed sensors 82, and calculates the wheel speeds Vw[] based on Expression (1).

Step 410: The CPU determines the first low wheel speed Vwmin, the second low wheel speed Vwmdl, the third low wheel speed Vwmdh, and the highest wheel speed Vwmax from the wheel speeds Vw[**].

Step 415: The CPU acquires the temperature Tm of the motor unit 260 from the temperature sensor 261.

In Step 420, the CPU determines whether or not the temperature Tm of the motor unit 260 is lower than the predetermined first temperature threshold value T1. Currently, the temperature Tm of the motor unit 260 is lower than the predetermined first temperature threshold value T1, and the CPU thus determines "Yes" in Step 420, and proceeds to Step 425. In Step 425, the CPU selects the first low wheel speed Vwmin as the reference speed Vw_ref. Then, the CPU proceeds to Step 495, and temporarily finishes this routine.

Meanwhile, the CPU is configured to execute a "traction control start/finish determination routine" illustrated in FIG. 5 as a flowchart every time a predetermined period of time elapses. The CPU is configured to execute the routine illustrated in FIG. 5 for each of the wheels W[**].

The CPU starts the routine of FIG. 5 from Step 500 at a predetermined timing, and proceeds to Step 505 to determine whether or not the traction control is being executed for the wheel W[**].

When it is assumed that the traction control is not currently being executed for the wheel W[], the CPU determines "No" in Step 505, and proceeds to Step 510** to determine whether or not a predetermined traction control inhibition condition is satisfied. The traction control inhibition condition is satisfied when any one of the following conditions 1 and 2 is satisfied.

(Condition 1): The temperature Tm of the motor unit 260 is higher than the predetermined stop temperature TL.

(Condition 2): After the temperature Tm of the motor unit 260 exceeded the predetermined stop temperature TL, the temperature Tm has not fallen below "TL-α". The symbol a is a constant to be used to determine whether or not the temperature Tm has become sufficiently lower than the predetermined stop temperature TL.

When the traction control inhibition condition is not satisfied, the CPU determines "No" in Step 510, and proceeds to Step 515 to calculate the wheel speed difference ΔVw[] (Vw[]-Vw_ref). Currently, the first low wheel speed Vwmin is selected as the reference speed Vw_ref, and ΔVw[] is thus a difference between the wheel speed Vw[] and the first low wheel speed Vwmin.

Then, the CPU proceeds to Step 520 to determine whether or not a predetermined execution condition is satisfied. The predetermined execution condition is satisfied when the wheel speed difference ΔVw[**] is equal to or more than the predetermined control start threshold value Th0.

When the execution condition is not satisfied, the CPU determines "No" in Step 520, and directly proceeds to Step 595 to temporarily finish this routine.

Conversely, when the execution condition is satisfied, the CPU determines "Yes" in Step 520, and sequentially executes processing in Step 525 and Step 530. The CPU then proceeds to Step 595 to temporarily finish this routine.

Step 525: The CPU starts the traction control for the wheel W[**] (namely, subject wheel). That is, the CPU increases the braking pressure for the subject wheel as described above. Then, as described above, the CPU repeats the increase/decrease in the braking pressure for the subject wheel until the traction control for the subject wheel is stopped or finished.

Step 530: The CPU sets the value of the current reference speed Vw_ref to a reference speed Vw_ref[] for the subject wheel. The reference speed Vw_ref[] is used to calculate the wheel speed difference ΔVw[**] for each subject wheel during the traction control (see Step 540 described later).

When the predetermined period of time has elapsed after the traction control was started as described above, the CPU again starts the processing from Step 500. In Step 505, the CPU determines "Yes", and proceeds to Step 535 to determine whether or not the temperature Tm of the motor unit 260 is equal to or lower than the predetermined stop temperature TL. Currently, the temperature Tm of the motor unit 260 is lower than the predetermined first temperature threshold value T1, and thus the CPU determines "Yes" in Step 535, and proceeds to Step 540.

In Step 540, the CPU calculates the wheel speed difference ΔVw[] (Vw[]−Vw_ref[**]). Then, the CPU proceeds to Step 545 to determine whether or not a predetermined finish condition is satisfied. The finish condition is satisfied when the following condition 3 is satisfied.

(Condition 3): The state in which the wheel speed difference ΔVw[**] of the subject wheel is equal to or less than the first threshold value Th1 has continued for a predetermined period of time or more.

When the finish condition is not satisfied, the CPU determines "No" in Step 545, and directly proceeds to Step 595 to temporarily finish this routine. That is, the traction control for the subject wheel is continued.

Conversely, when the finish condition is satisfied, the CPU determines "Yes" in Step 545, and proceeds to Step 550 to finish the traction control for the subject wheel. That is, the braking force that has been exerted on the subject wheel is reduced to "0". Then, the CPU proceeds to Step 595 to temporarily finish this routine.

(State 2) The temperature Tm of the motor unit 260 is equal to or higher than the first temperature threshold value T1 and lower than the predetermined second temperature threshold. value T2.

Under this state, the CPU starts the routine illustrated in FIG. 4 from Step 400, executes the processing from Step 405 to Step 415, and proceeds to Step 420. In Step 420, the CPU determines "No", and proceeds to Step 430.

In Step 430, the CPU determines whether or not the temperature Tm of the motor unit 260 is lower than the predetermined second temperature threshold value T2. Under this state, the CPU determines "Yes" in Step 430, and proceeds to Step 435 to select the second low wheel speed Vwmdl as the reference speed Vw_ref. Then, the CPU proceeds to Step 495 to temporarily finish this routine.

It is assumed that the traction control is not yet executed under such a state. When the CPU starts the routine illustrated in FIG. 5 from Step 500, the CPU determines "No" in each of Step 505 and Step 510, and proceeds to Step 515. In Step 515, the CPU calculates the wheel speed difference ΔVw[] (Vw[]−Vw_ref[]). Currently, the second low wheel speed Vwmdl is selected as the reference speed Vw_ref, and thus ΔVw[] is a difference between the wheel speed Vw[**] and the second low wheel speed Vwmdl.

Then, the CPU proceeds to Step 520 to determine whether or not the predetermined execution condition is satisfied. When the execution condition is not satisfied, the CPU determines "No" in Step 520, and directly proceeds to Step 595 to temporarily finish this routine.

Conversely, when the execution condition is satisfied, the CPU determines "Yes" in Step 520, and sequentially executes the processing in Step 525 and Step 530 as described above. Then, the CPU proceeds to Step 595 to temporarily finish this routine. When the CPU again starts the processing from Step 500 when the predetermined period of time has elapsed after the traction control was started, the CPU determines "Yes" in Step 505, and proceeds to Step 535. Then, the CPU executes the processing in appropriate steps from among Step 535 to Step 550 as described above.

(State 3) The temperature Tm of the motor unit 260 is equal to or higher than the second temperature threshold value T2 and equal to or lower than the stop temperature TL.

Under this state, the CPU starts the routine illustrated in FIG. 4 from Step 400, executes the processing from Step 405 to Step 415, and proceeds to Step 420. In Step 420, the CPU determines "No", and proceeds to Step 430. Further, the CPU determines "No" in Step 430, and proceeds to Step 440 to select the third low wheel speed Vwmdh as the reference speed Vw_ref. Then, the CPU proceeds to Step 495 to temporarily finish this routine.

It is assumed that the traction control is not yet executed under such a state. When the CPU starts the routine illustrated in FIG. 5 from Step 500, the CPU determines "No" in each of Step 505 and Step 510, and proceeds to Step 515. In Step 515, the CPU calculates the wheel speed difference ΔVw[] (Vw[]−Vw_ref[]). Currently, the third low wheel speed Vwmdh is selected as the reference speed Vw_ref, and thus ΔVw[] is a difference between the wheel speed Vw[**] and the third low wheel speed Vwmdh.

Then, the CPU proceeds to Step 520 to determine whether or not the predetermined execution condition is satisfied. When the execution condition is not satisfied, the CPU determines "No" in Step 520, and directly proceeds to Step 595 to temporarily finish this routine.

Conversely, when the execution condition is satisfied, the CPU determines "Yes" in Step 520, and sequentially executes the processing in Step 525 and Step 530 as described above. Then, the CPU proceeds to Step 595 to temporarily finish this routine. When the CPU again starts the processing from Step 500 when the predetermined period of time has elapsed after the traction control was started, the CPU determines "Yes" in Step 505, and proceeds to Step 535. Then, the CPU executes the processing in appropriate steps from among Step 535 to Step 550 as described above.

(State 4) The temperature Tm of the motor unit 260 is higher than the stop temperature TL.

When the traction control is executed under the state 3, the temperature Tm of the motor unit 260 may exceed the predetermined stop temperature TL. When the CPU starts the routine of FIG. 5 from Step 500 and proceeds to Step 535 under this state, the CPU determines "No" in Step 535, and directly proceeds to Step 550. In Step 550, the CPU finishes the traction control for the subject wheel.

After the finish of the traction control for the subject wheel, when the CPU again starts the routine illustrated in FIG. 5 from Step 500, the CPU determines "No" in Step 505, and proceeds to Step 510. In this case, the condition 1 is satisfied, and the traction control inhibition condition is thus satisfied. Thus, the CPU determines "Yes" in Step 510, and directly proceeds to Step 595 to temporarily finish this routine. That is, the execution of the traction control is inhibited.

Further, it is assumed that, after the traction control for the subject wheel is finished, the temperature Tm of the motor unit 260 becomes equal to or lower than the predetermined stop temperature TL. When the CPU again starts the routine illustrated in FIG. 5 from Step 500, the CPU determines "No" in Step 505, and proceeds to Step 510. When the temperature Tm of the motor unit 260 has not fallen below "TL-α", the condition 2 is satisfied, and the traction control inhibition condition is thus satisfied. Therefore, the CPU determines "Yes" in Step 510, and directly proceeds to Step 595 to temporarily finish this routine in such a manner, the execution of the traction control is inhibited until the temperature Tm of the motor unit 260 falls below "TL-α".

The control apparatus described above selects a relatively high wheel speed out of the wheel speeds Vw[**] as the reference speed Vw_ref in accordance with the increase in the temperature Tm of the motor unit 260. As a result, the execution frequency of the traction control in a certain period gradually decreases as the temperature Tm increases. Thus, a rapid increase in the temperature Tm of the motor unit 260 can be suppressed. The temperature Tm of the motor unit 260 is less likely to reach the predetermined stop temperature TL (that is, the traction control is less likely to be stopped), and the vehicle can thus relatively stably travel on the specific road surface.

Further, the control apparatus is configured to inhibit the execution of the traction control when the temperature Tm of the motor unit 260 in the hydraulic circuit 43 of the braking device 40 is higher than the stop temperature TL. The execution of the traction control is inhibited when the temperature Tm of the motor unit 260 is excessively high, and malfunction can thus be prevented from occurring in the motor unit 260 of the hydraulic circuit 43.

The present disclosure is not limited to the above-mentioned embodiment, and various modification examples can be adopted within the scope of the present disclosure.

The wheel slip index value to be used to start the traction control is not limited to that of the above-mentioned example. For example, the wheel slip index value is only required to be a value correlated with the wheel speed difference ΔVw[]. Thus, the wheel slip index value may be, for example, a value obtained by dividing the wheel speed difference ΔVw[] by the reference speed Vw_ref [] ("slip ratio"=ΔVw[]/Vw_ref[**]).

The brake ECU 70 may use only the predetermined first temperature threshold value T1 to determine the reference speed Vw_ref. That is, Step 430 and Step 440 of the routine illustrated in FIG. 4 may be omitted.

When the temperature Tm of the motor unit 260 is lower than the predetermined first temperature threshold value T1, the brake ECU 70 may determine the second low wheel speed Vwmdl as the reference speed Vw_ref. In this configuration, Step 425 and Step 435 are replaced as described below. Further, Step 430 and Step 440 are omitted.

Step 425: The CPU selects the second low wheel speed Vwmdl as the reference speed Vw_ref.

Step 435: The CPU selects the third low wheel speed Vwmdh as the reference speed Vw_ref.

The temperature sensor 261 may be mounted to a component other than the motor unit 260 in the hydraulic circuit 43. For example, the temperature sensor 261 may be mounted to at least one of the solenoid valves (202f and 202r, 212[], 216[], and 227f and 227r), which are the actuators in the hydraulic circuit 43. When the temperature sensors 261 are mounted to the plurality of solenoid valves, the brake ECU 70 may employ the highest temperature Tm' out of the plurality of the temperatures as the actuator temperature Tm. In this case, the brake ECU 70 selects the reference speed Vw_ref in accordance with the increase in the temperature Tm' as described above.

The brake ECU 70 may estimate the temperature (namely, actuator temperature) Tm of the motor unit 260 based on a value of current flowing through the motor unit 260 and a current supply period of the current, for example. Further, the brake ECU 70 may estimate the temperature of the solenoid valve from the operation information on the solenoid valve. For example, the brake ECU 70 may acquire a resistance value of an electromagnetic coil in the solenoid valve, and may estimate the temperature of the solenoid valve from a lookup table (map) in which the resistance value and the temperature are associated with each other.

The brake ECU 70 may increase the predetermined control start threshold value Th0 in accordance with the increase in the temperature Tm of the motor unit 260. More specifically, when the temperature Tm of the motor unit 260 is equal to or higher than the predetermined first temperature threshold value T1 and lower than the predetermined second temperature threshold value T2, the brake ECU 70 may select the first low wheel speed Vwmin as the reference speed Vw_ref, and may increase the control start threshold value Th0 by a value of "second low wheel speed Vwmdl-first low wheel speed Vwmin". This is substantially the same as the above-mentioned processing of selecting the second low wheel speed Vwmdl as the reference speed Vw_ref.

Further, when the temperature Tm of the motor unit 260 is equal to or higher than the predetermined second temperature threshold value T2 and equal to or lower than the predetermined stop temperature TL, the brake ECU 70 may select the first low wheel speed Vwmin as the reference speed Vw_ref, and may increase the control start threshold value Th0 by a value "third low wheel speed Vwmdh-first low wheel speed Vwmin". This is substantially the same as the above-mentioned processing of selecting the third low wheel speed Vwmdh as the reference speed Vw_ref. In addition, when the actuator temperature Tm (the temperature Tm of the motor unit 260 or the temperature of the solenoid valve) exceeds the stop temperature TL while the traction control is being executed, the brake ECU 70 may immediately stop the traction control.

What is claimed is:

1. A control apparatus for a four-wheel drive vehicle, comprising:
    a drive device configured to generate a driving force;
    a driving force transmission device configured to transmit the driving force to a left front wheel, a right front wheel, a left rear wheel, and a right rear wheel;
    a braking device including a hydraulic circuit including a flow path through which brake fluid flows, a plurality of solenoid valves, a pump, and a drive unit configured to drive the pump, the braking device being configured to apply a braking force independently to each of the left front wheel, the right front wheel, the left rear wheel, and the right rear wheel in accordance with a hydraulic pressure of the brake fluid supplied from the hydraulic circuit;
    a temperature acquisition device configured to execute one of acquisition and estimation of a temperature of one of: the plurality of solenoid valves; and the drive unit, as an actuator temperature; and
    a controller configured to start traction control of causing the braking device to apply the braking force to a wheel having a wheel slip index value equal to or more than a predetermined control start threshold value, the wheel slip index value being correlated with a wheel speed difference, which is a difference between a wheel speed of each of the left front wheel, the right front wheel, the left rear wheel, and the right rear wheel and a reference speed, wherein the controller is configured to:

select a low-side wheel speed, which is any one of a first low wheel speed, which is the lowest wheel speed, and a second low wheel speed, which is the second lowest wheel speed, out of the wheel speeds of the left front wheel, the right front wheel, the left rear wheel, and the right rear wheel, as the reference speed when the actuator temperature is lower than a predetermined first temperature threshold value; and select a wheel speed that is different from the highest wheel speed, and is higher than the low-side wheel speed selected as the reference speed when the actuator temperature is lower than the predetermined first temperature threshold value, out of the wheel speeds of the left front wheel, the right front wheel, the left rear wheel, and the right rear wheel, as the reference speed when the actuator temperature is equal to or higher than the predetermined first temperature threshold value.

2. The control apparatus for a four-wheel drive vehicle according to claim 1, wherein the controller is configured to inhibit execution of the traction control when the actuator temperature is higher than a stop temperature, which is higher than the predetermined first temperature threshold value.

3. The control apparatus for a four-wheel drive vehicle according to claim 1, wherein the controller is configured to:

select the first low wheel speed as the reference speed when the actuator temperature is lower than the predetermined first temperature threshold value;

select the second low wheel speed as the reference speed when the actuator temperature is equal to or higher than the predetermined first temperature threshold value and lower than a predetermined second temperature threshold value, which is higher than the predetermined first temperature threshold value; and select a third low wheel speed, which is the third lowest wheel speed out of the wheel speeds of the left front wheel, the right front wheel, the left rear wheel, and the right rear wheel, as the reference speed when the actuator temperature is equal to or higher than the predetermined second temperature threshold value.

4. The control apparatus for a four-wheel drive vehicle according to claim 3, wherein the controller is configured to inhibit execution of the traction control when the actuator temperature is higher than a stop temperature, which is higher than the predetermined second temperature threshold value.

* * * * *